INVENTOR.
GENE HIRS.
BY Wallace P. Lamb
ATTORNEY.

INVENTOR.
GENE HIRS.
BY
Wallace P. Lamb
ATTORNEY.

April 19, 1960

G. HIRS 2,933,179

PARTS STORAGE APPARATUS

Filed March 26, 1958

INVENTOR.
GENE HIRS.
BY
Wallace P. Lamb
ATTORNEY.

April 19, 1960  G. HIRS  2,933,179
PARTS STORAGE APPARATUS
Filed March 26, 1958  5 Sheets—Sheet 5

INVENTOR.
GENE HIRS.
BY Wallace P. Lamb
ATTORNEY.

United States Patent Office 2,933,179
Patented Apr. 19, 1960

2,933,179

PARTS STORAGE APPARATUS

Gene Hirs, Detroit, Mich.

Application March 26, 1958, Serial No. 723,996

5 Claims. (Cl. 198—219)

This invention relates generally to parts handling apparatus and particularly to a vertical and automatically operable parts storage apparatus.

In manufacturing facilities of high production products there is a need for efficient storage and ready supply of parts in order to insure uninterrupted manufacturing operations. In some instances in the past, it has been the practice to have conveyors extending long distances and over wide areas of a manufacturing plant solely as mobile storage facilities which maintained parts supply, but at a great sacrifice of efficiency with respect to area occupied. In some instances, there has been an effort made to provide vertical parts storage units in a conveyor system, but insofar as I am aware such units are expensive to manufacture and equally objectionable are limited to the handling of parts that are rounded or otherwise shaped so that they will roll down an incline or chute.

Accordingly, it is the principal object of my invention to provide an improved vertical parts storage unit that will improve manufacturing operations efficiently.

Another object of my invention is to provide an improved vertical parts storage unit that will handle parts other than those that will roll down inclines.

Another object of my invention is to provide an improved vertical parts storage unit of a structural character to automatically move the parts upwardly from a loyer entrance toward an upper exit.

Other objects of the invention will become apparent from the following detail description, taken in connection with the accompanying drawings in which.

Figure 1:
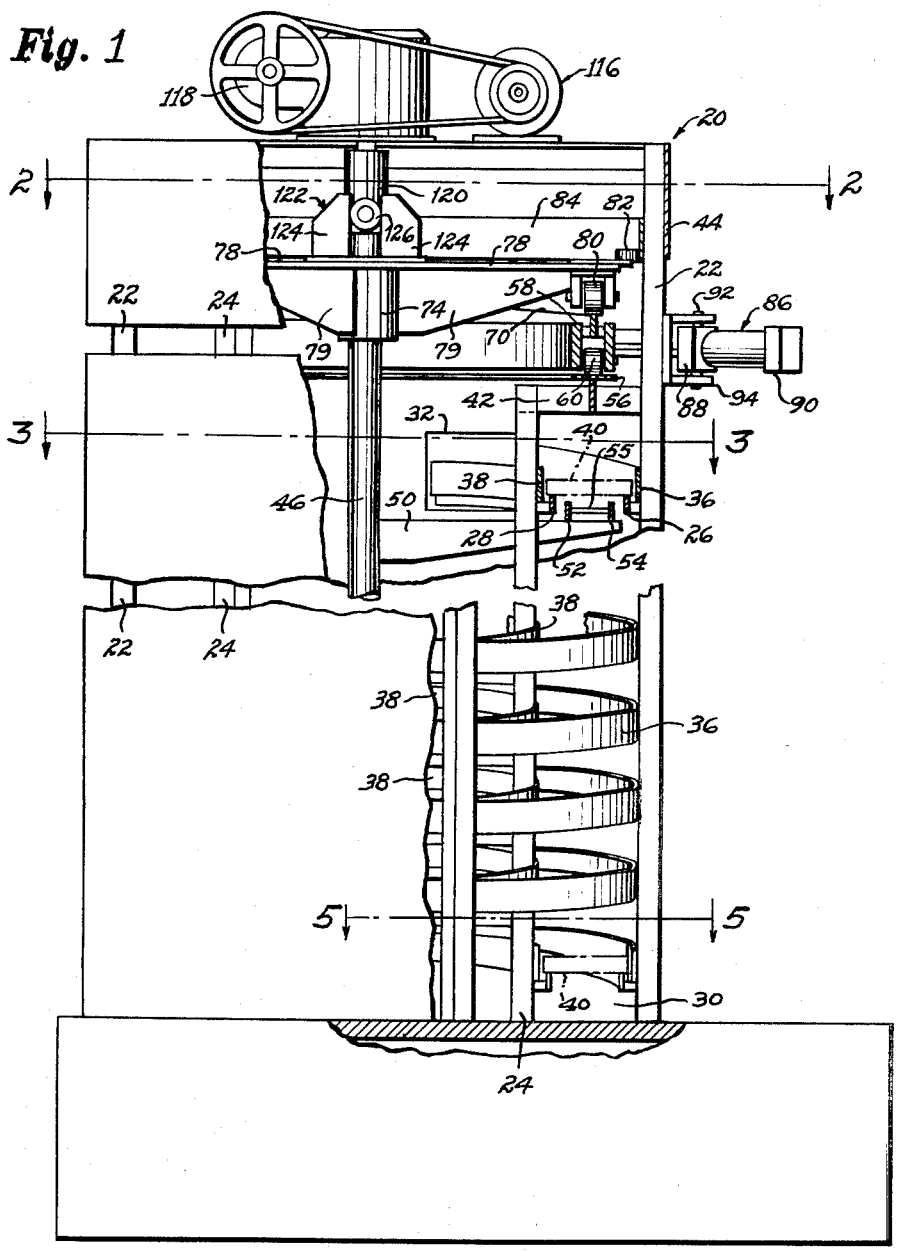
Fig. 1 is an elevational view of my parts storage apparatus having parts broken away to illustrate certain details of construction.

Referring to the drawings by characters of reference, the numeral 20 designates generally a parts storage unit the structure of which preferably includes radially spaced outer posts 22 and radially spaced inner posts 24. Between and supported by the posts 22 and 24 is a pair of spaced helical supporting rails 26 and 28 that extend in parallel relation and are upwardly inclined from a lower parts entrance 30 to a parts exit 32. The supporting rails 26 and 28 are respectively spaced from the posts 22 and 24 by suitable spacers 34, and the posts, spacers and rails may be welded, or be otherwise suitably secured together to provide a rigid structure.

Figure 6:
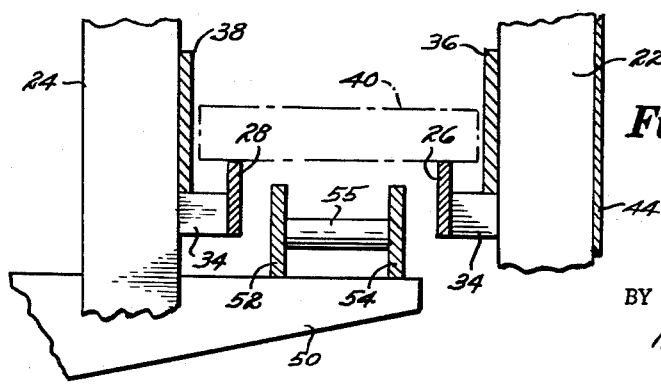
Fig. 6 is an enlarged, fragmentary cross sectional view, taken along line 6—6 of Fig. 5.

Secured to the inner faces of the outer posts 22 is a guide rail 36 and secured to the inner faces of the inner posts is a similar guide rail 38. These guide rails 36, 38 may be welded to the posts and as shown more clearly in Fig. 6 function to restrict lateral movement of the parts to be stored of which one is shown at 40 in dot and dash lines. The structure 20 is preferably further reinforced above the helical rails 26, 28 by braces 42 which join the inner posts 24 together and to the outer posts (see Fig. 2). Preferably, an outer sheet metal casing 44 encloses the structure and is welded or otherwise suitably secured to the outer posts 22.

A rotatable shaft 46 has its axis of rotation vertically disposed substantially coincident with the helix axis of the helical rails 26 and 28, and carries a helical parts transfer member 48. The transfer member 48 is supported between rails 26 and 28 on radially extending arms 50 that are secured to shaft 46 and to the transfer member 48 such as by welding the parts together. Preferably, the transfer member 48 is a fabricated member made up of a pair of helical, spaced parallel rails 52 and 54 held apart by spacers 55 to which the rails may be welded to provide a rigid structure. This helical transfer member 48 extends substantially from the parts entrance 30 to the exit 32 of the storage unit.

Figure 4:
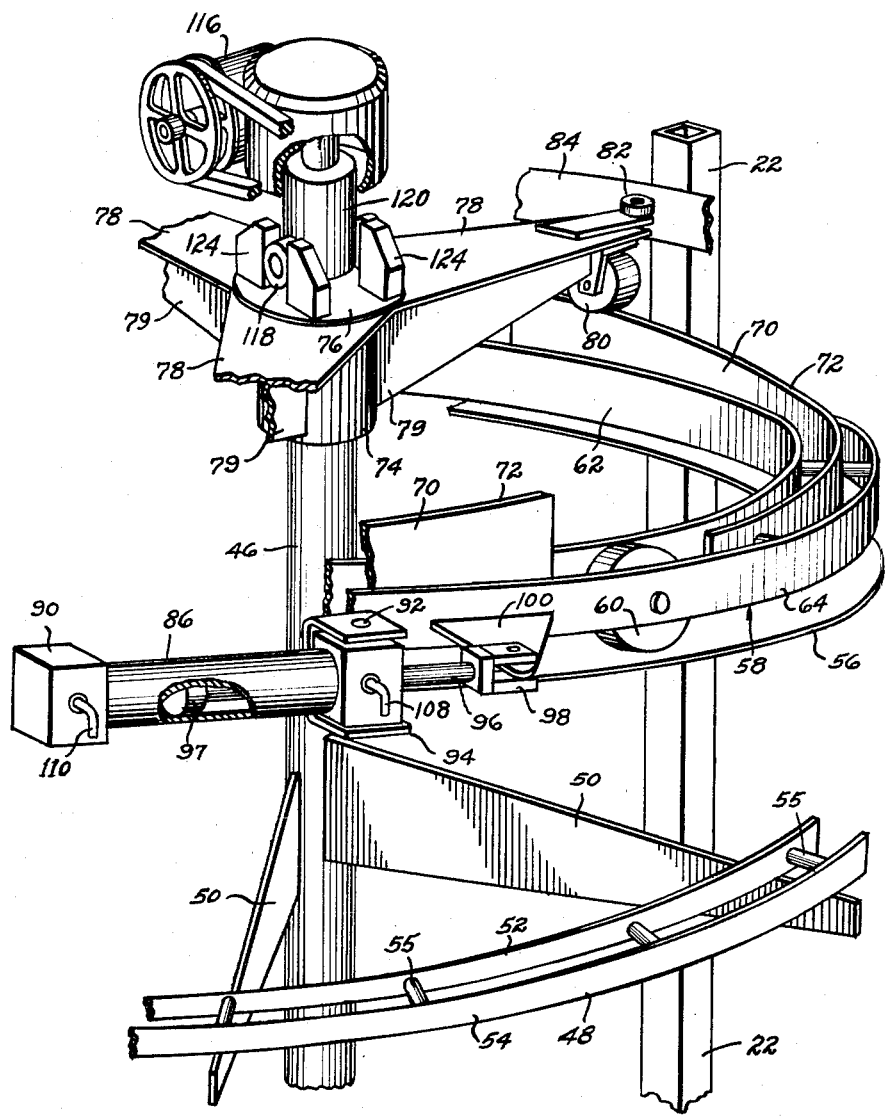
Fig. 4 is an enlarged, fragmentary perspective view.
Figure 5:
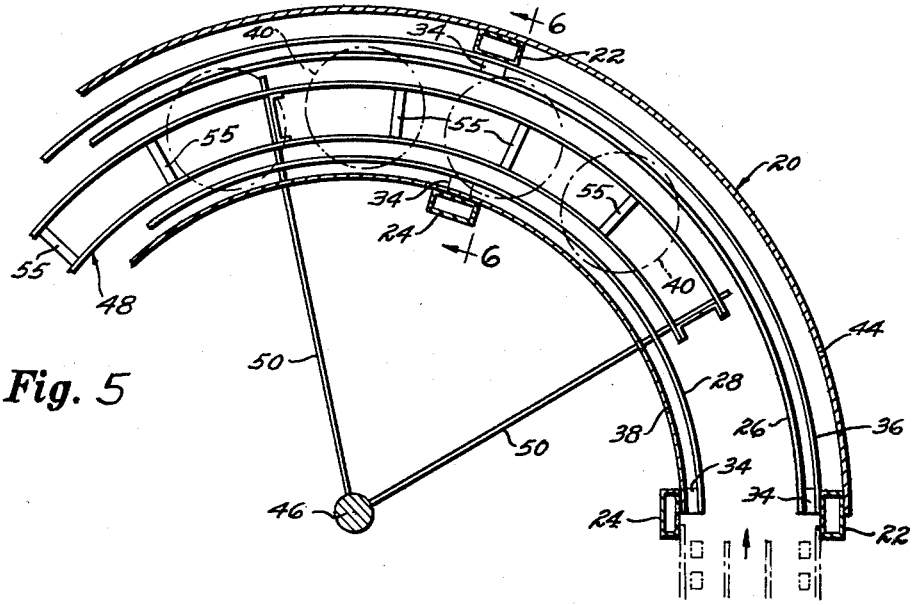
Fig. 5 is an enlarged fragmentary cross sectional view, taken along the line 5—5 of Fig. 1.

Mounted on and rigidly secured to the braces 42 is an annular upwardly facing track 56 which extends horizontally around the shaft 46 directly above the transfer member 48 (see Fig. 4). A rotatable cam carrier in the general shape of a ring 58 is provided and overlies the track 56, the ring 58 having radially spaced rollers 60 mounted thereon to ride on the track. The ring 58 may be fabricated of an inner ring member 62 and an outer ring member 64 spaced apart by radially disposed spacers 66 which may be welded or be otherwise secured to the ring members 62 and 64.

Carried by the rotatable ring 58 are radially spaced ramps or cams 70 which, as shown, may position between the inner and outer ring members 62 and 64 and be welded or otherwise rigidly secured to the spacers 66. The cams 70, of which there are three in the present construction, each have upwardly facing helical cam surfaces 72 on which the helical parts transfer member 48 is supported. On the upper end of the shaft 46 of the transfer member 48 is secured a hub 74 having an enlarged upper flange 76, and secured to said hub beneath said flange are radially extending arms 78 each of which carries a cam follower or roller 80 engaging respectively the cam surfaces 72 of cam members 70. Also carried by each of the arms 78 at the outer ends thereof is a guide roller 82 which rolls against a vertical guide rail 84 that is secured to the inner faces of the posts 22. Preferably each of the arms 78 is reinforced by a vertical rib 79, welded to the hub 74 and arm 78 and to the mounting brackets that support rollers 82.

A power element or air cylinder 86 may be employed to rotate the cam ring 58 and therefore cams 70, and is pivotally mounted on the structure 20. The air cylinder 86 is a conventional type having heads 88 and 90 on opposite ends thereof, the head 88 having trunnion pins 92 to pivot the cylinder on a U-shaped bracket 94 that is welded to one of the posts 22. A plunger or rod 96, connected at one end thereof to the usual piston 97 in the cylinder 86 may be provided on its other end with a clevis 98 pivotally connected to a lug 100 on the cam ring 58 (see Fig. 4).

A double solenoid 102 may be provided to control operation of the cylinder piston 97 and includes the usual valve body 104 which is connected to a source of compressed air by a pipeline 106 and to opposite ends of cylinder 86 by a pair of separate flexible conduits 108 and 110 to allow for movement of the cylinder. Within the valve body 104, a pair of valves (not shown) respectively control air flow to opposite ends of the cylinder 86 and are energized respectively by a pair of coils 112 and 114. It will be understood that solenoid 102 is of the type in which the coils 112 and 114 are normally closed and may be energized separately to open one or the other of the valves.

A three-phase reversible electric motor 116 is mounted on the top of structure 20 and is provided to rotate the parts transfer member 48 through a predetermined arc and return the transfer member to starting position. A speed reduction mechanism 118 may be driven by a belt and pulley drive connection from the drive shaft of motor 116 to rotate a vertical shaft 120 which is above and axially aligns with the upper end of shaft 46. The shafts 120 and 46 are connected together by a slip drive connection, designated generally by the numeral 122, to provide for vertical, as well as, rotational movement of shaft 46. The slip drive shown includes a socket type connection formed of two pair of spaced lugs 124, secured to the top of shaft 46 to receive a transverse pin 126 that is secured in and to the driving shaft 120.

Figure 8:
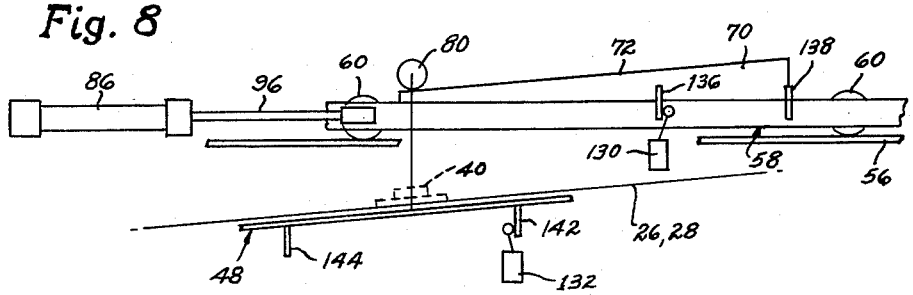
Figs. 8 to 11 are diagrammatic views illustrating the operation of the apparatus.
Figure 9:
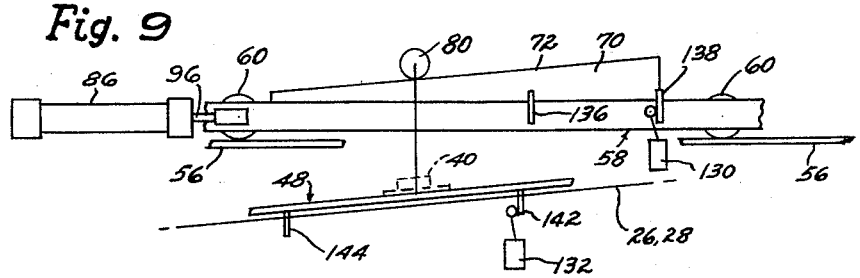

Mounted on the frame structure of the apparatus (see Figs. 2 and 3) is a pair of spaced limit switches 130 and 132 which control the motor 116 and also the solenoid 102. As is shown more clearly in Fig. 8, the limit switch 130 has an operating arm 134 arranged to be actuated alternately by a pair of spaced lugs 136 and 138 on the cam ring 58. Similarly, the other limit switch 132 has an operating arm 140 arranged to be actuated alternately by a pair of radially spaced lugs 142 and 144 on the outer rail 54 of the parts transfer member 48.

Figure 7:
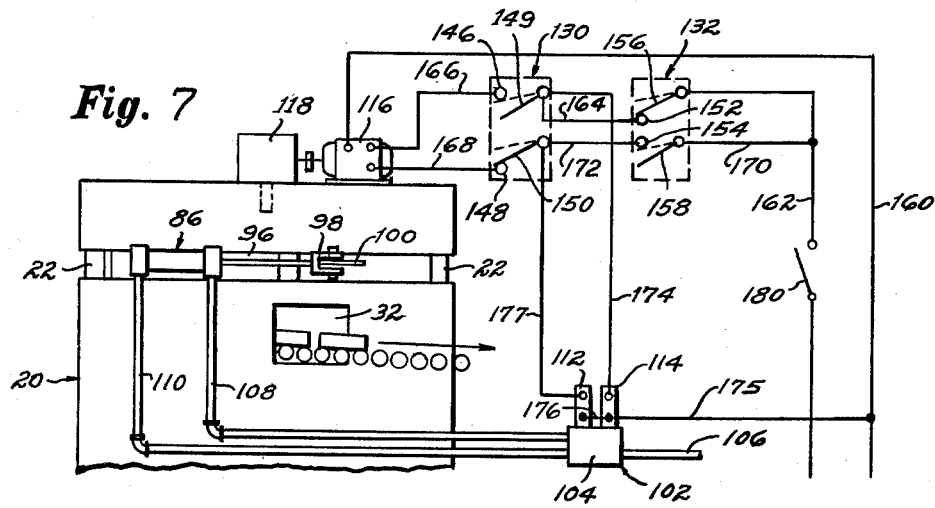
Fig. 7 is a diagrammatic illustration of the apparatus including a control system therefor.

With reference particularly to Fig. 7, the limit switch 130 is diagrammatically represented as comprising a double throw switch including a pair of fixed contacts 146 and 148 which are cooperable respectively with a pair of movable contacts 149 and 150. Similarly, the limit switch 132 is illustrated as comprising a double throw switch including a pair of fixed contacts 152 and 154 which are cooperable respectively with a pair of movable contacts 156 and 158. The movable contacts 149 and 150 are shown in Fig. 7 in the positions to which they are moved by and when the parts transfer member 48 moves down or to its starting position and the movable contacts 152 and 154 of limit switch 132 are shown in corresponding positions.

The numerals 160 and 162 designate main electric power lines of which the line 160 is connected to one terminal of the three-phase motor 116, and the main line 162 is connected to the limit switch contact 156. A lead 164 connects the fixed contact 152 of limit switch 132 to the movable contact 149 of limit switch 130 which has its fixed contact 146 connected by a lead 166 to a terminal of motor 116. From another terminal of motor 116, a lead 168 connects to the fixed terminal 148 of limit switch 130, the other limit switch 132 having its movable contact 158 connected to main lead 162 by a lead 170 and its fixed contact connected by a lead 172 to the movable contact 150 of limit switch 130. From the movable contact 149 of limit switch 130, a lead 174 connects to one end of solenoid coil 114, which has its other end connected by a lead 175 to main line 160 and also by a lead 176 to one end of coil 112 which has its other end connected by a lead 177 to movable contact 150 of limit switch 130. In the main power line 162 is provided a line switch 180 which when closed starts operation of the parts storage apparatus.

*General operation*

Figure 2:
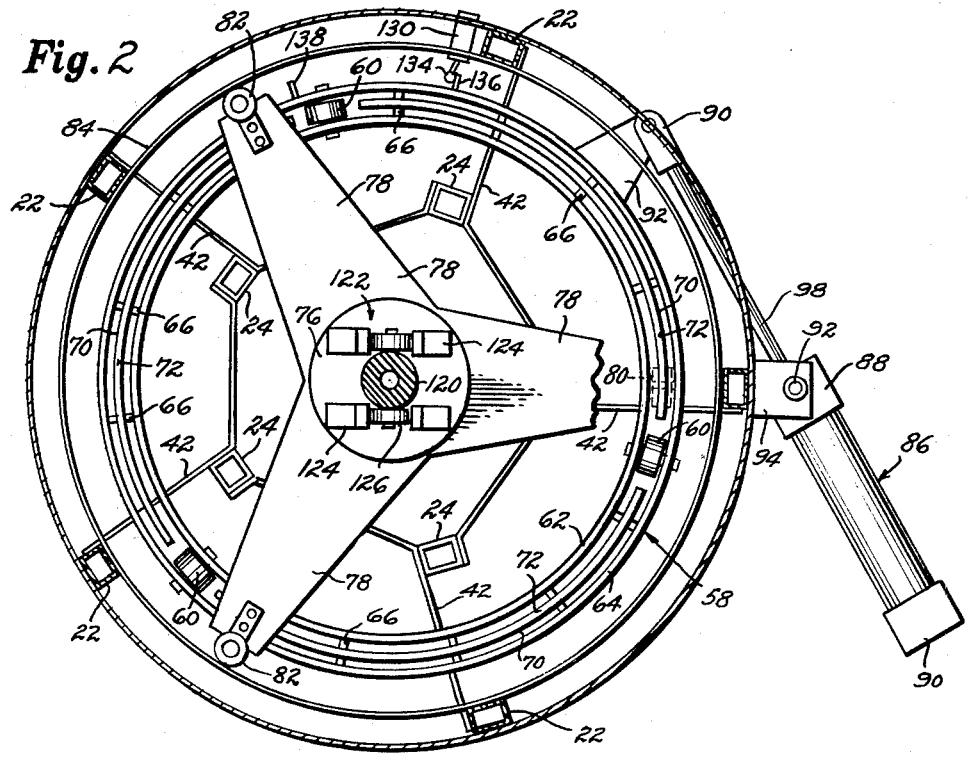
Fig. 2 is a cross sectional view, taken along line 2—2 of Fig. 1.
Figure 3:
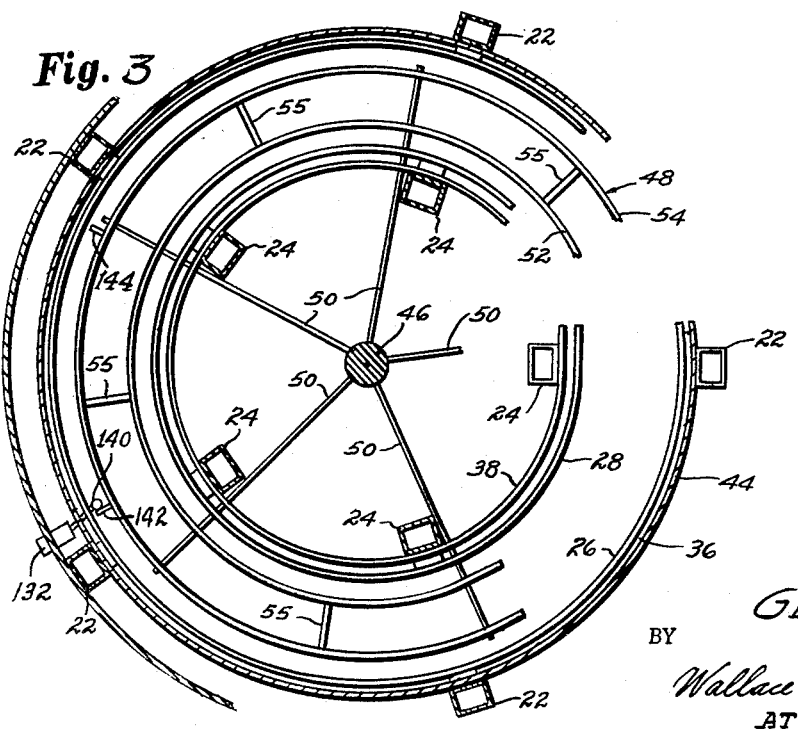
Fig. 3 is another cross sectional view, taken along line 3—3 of Fig. 1.
Figure 10:
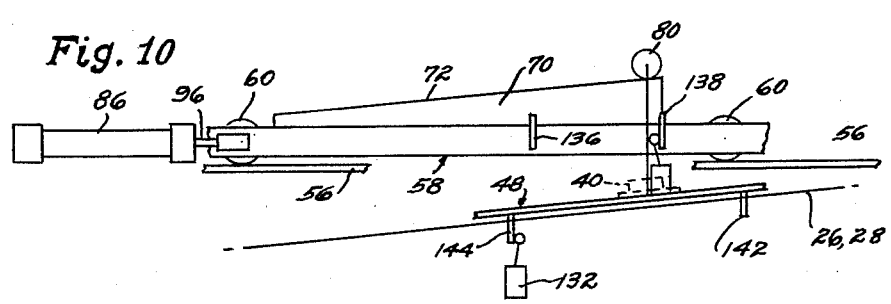
Figure 11:
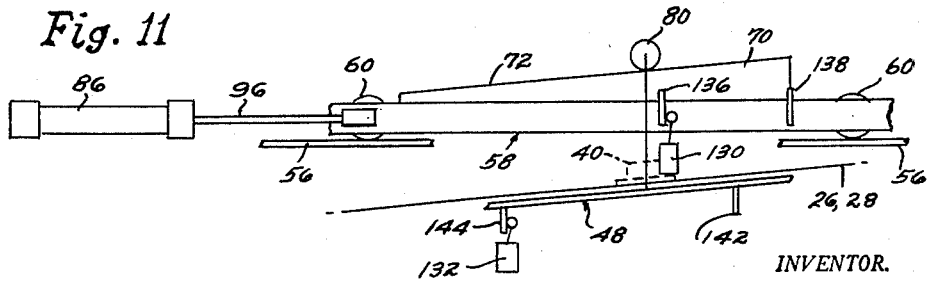

With particular reference to Figs. 8 to 11, when the line switch 180 is closed, the cam ring 58 operates first and moves to the left or clockwise as viewed in Fig. 2. This movement of the cams 70 raises the helical parts transfer member 48 vertically upward which lifts the part or parts 40 clear of the fixed supporting rails 26, 28, as shown for example in Fig. 9. Upon completion of the raising of the parts transfer member 48, said member is then rotated by motor 116 in a direction to advance the parts along the inclined rails 26, 28, the transfer member 48 being supported during such movement on the cams 70. After predetermined travel, the parts transfer member 48 stops as represented in Fig. 10 and then cam ring 58 is moved to the right, as viewed in Fig. 11 or counter clockwise as viewed in Fig. 2 whereupon the part or parts 40 are reseated at their new heights on the supporting rails 26, 28. The motor 116 is then reversed in its direction of operation which returns the transfer member 48 to its starting position followed by the cam ring 58 to repeat the operations of moving the parts along the helical supporting rails 26, 28.

*Detail operation*

Upon closing of the main line switch 180, the following circuit is completed to the solenoid coil 114: From main line 160 through lead 175, coil 114, leads 174, 164 and through the closed limit switch contacts 152, 156 to the other power line 162. The resultant energization of solenoid coil 114 opens line 108 which causes the air cylinder to move the cam ring 58 to raise the helical parts transfer member 48 to the position shown in Fig. 9. When the cam ring 58 rotates sufficiently to move limit switch 130 to the dot and dash position of Fig. 7, contacts 148 and 150 will be broken to stop the cam ring and contacts 149 and 146 will be made to start motor 116. In this stopped position, the cams 70 have lifted the parts transfer member 48 vertically upwardly lifting the parts from the supporting rails 26, 28. This circuit of the motor is as follows: From main line 160, through motor 116, lead 166, limit switch contacts 146, 149, lead 164, and through limit switch contacts 152, 156 to the other main line 162. The reversible motor 116 operates in a direction to rotate the parts transfer member 48 to the position shown in Fig. 10 in which the lug 144 has actuated limit switch 132. Actuation of limit switch 132 moves the contacts 156, 158 thereof to the dotted positions shown which stops motor 116 and establishes the following circuit to the solenoid coil 112: From main line 160 through leads 175, 176, coil 112, leads 177, 172 and through the now closed contacts 154, 158 to the other main line 162. Thus, solenoid coil 112 is energized to open line 110 which actuates the air cylinder 86 to move the cam ring to the position represented in Fig. 11, the cam acting to lower the parts transfer member 48 so as to set the parts down in the new, higher positions on the supporting rails 26, 28. When the cam ring 58 moved to lower the parts transfer member 48, the lug 138 on the ring actuated limit switch 130 which stopped the ring, the limit switch contacts 150 returning to the full line positions shown. This establishes the following closed circuit to the motor 116: From main line 160 through the motor 116, lead 168, contacts 148, 150, lead 172, the still closed contacts 154, 158, and through lead 170 to the other main line 162. The motor 116 now rotates in the opposite direction to that mentioned above which rotates the parts transfer member 48 back to its starting position in which it is stopped when lug 142 actuates limit switch 132. This moves limit switch 132 back to its full line position shown in Fig. 6 and the cycle of operations is repeated.

From the foregoing description, it will now be appreciated that I have provided an improved parts storage apparatus by means of which flat-sided parts or parts other than those that will roll down an incline may be fed and stored in the apparatus for ready accessibility. It will be further appreciated that my storage apparatus provides a means of storing a large number of parts vertically in a compact unit that will occupy a relatively small area in a conveyor line and one which will automatically load the parts. One of the advantages of feeding the parts in at the bottom of the apparatus and removing them from the top is that, if desired, parts washing nozzles may be inserted in the lower area of the apparatus and wash the parts without having the dirty wash water dripping over clean parts.

While I have shown and described my invention in considerable detail, it will be understood that many variations in the invention may be made without departing from the spirit and scope thereof.

I claim:

1. A parts feeding and storage apparatus comprising, a pair of spaced helical rails having a vertical helical axis, a helical parts feeder member between said pair of rails having a vertical helix axis substantially coincident with the helix axis of said rails and having a helix angle substantially equal to the helix angle of said rails, said feeder member having a lower position below the parts supporting surfaces of said pair of rails and movable upwardly to lift the parts from said rails, said feeder member movable relative to said rails about the helix axis thereof, a helical ramp having its helix axis substantially coincident with the helix axis of said rails, a cam member movable along said ramp and having an upper helical cam surface, cam follower means on said feeder member supporting said feeder member on the upper cam surface of said cam member, power means operable to reciprocate said cam member to raise and lower said feeder member to lift and lower a part relative to said rails, and power means operable to rotate said feeder member between the raising and lowering operations thereof and controlled by movement of said cam member.

2. A parts feeding and storage apparatus comprising, supporting means, a pair of spaced parts substantially parallel helical rails having a vertical helix axis and supported by said supporting means, a vertical shaft substantially coincident with the helix axis, means supporting said shaft for rotation and also for vertical movement, a helical parts feeder member supported by and extending about said shaft between said rails and having substantially the same helix angle as said rails, a helical ramp fixed to said supporting means above said rails and having a helix axis substantially coincident with the helix axis of said rails, a cam member movable along said ramp, power means operable to reciprocate said cam member up and down said ramp, cam follower means fixed to said shaft to rotate therewith and supported on said cam member, power means operable to oscillate said shaft, switch means actuated by said cam member controlling oscillation of said shaft, and switch means actuated by said feeder member controlling said cam member.

3. A parts feeding and storage apparatus comprising, a stationary supporting member having a helical seating surface for the parts and having a vertical helix axis, a second supporting member having a helical seating surface for the parts and having a vertical helix axis coincident with the helix axis of said first supporting member, said helical seating surfaces having substantially the same helix angle, said second supporting member movable upwardly from a position below the parts supporting seating surface of said stationary supporting member to lift the parts from the latter and said second supporting member movable about the helical axis relative to said stationary supporting member, a helical ramp having its helix axis coincident with the helix axes of said supporting members, a cam member movable along said ramp about the coincident helix axes, cam follower means seating on said cam member and carrying said movable supporting member, power means operable to reciprocate said cam member to raise and lower said movable supporting member to lift and lower a part relative to the seating surface of said other supporting member, and power means operable to rotate said movable supporting member about the helix axis thereof between the raising and lowering operations by the first power means and controlled by movement of said cam member.

4. A parts feeding and storage apparatus comprising, a helical stationary supporting member having a seating surface for the parts and a vertical helix axis, a second helical supporting member having a seating surface for the parts and a vertical helix axis coincident with the helix axis of said first supporting member, said supporting members having substantially the same helix angle, said second supporting member movable upwardly from a position below the parts supporting surface of the other supporting member to lift the parts from the latter and also movable about the coincident axes to move the parts up the helix angle of said stationary supporting member, a helical ramp member having its helix axis coincident with the helix axis of said supporting members and having an upwardly facing ramp surface, a helical cam member having its helix axis coincident with the helix axis of said ramp and reciprocal on said ramp surface about the helix axes, power means operable to reciprocate said cam member up and down said ramp surface, cam follower means riding on said cam member and carrying said movable supporting member, power means operable to rotate said movable supporting means first in one and then in the opposite direction, control means actuated by said reciprocating cam member controlling rotation of the movable supporting means in opposite directions, and control means actuated by said movable supporting member and controlling reciprocation of said reciprocal cam member.

5. A parts feeding and storage apparatus comprising, upright radially spaced posts, a pair of parallel helical supporting members for the parts, said supporting members rigidly secured to said posts and having a vertical helix axis, a helical parts feeder member disposed between said supporting members, said parts feeder member having the same helix angle as said supporting members, a rotatable shaft having its axis of rotation coincident with the helix axis of said supporting members and supporting said parts feeder member, a helical ramp member rigidly secured to said posts above said supporting members and parts feeder member, said ramp member having a helix axis coincident with the helix axes of said supporting members and having a helix angle equal to the helix angle of said parts feeder member, a ring-like carrier member having supporting rollers riding on said helical ramp member, three radially spaced upwardly facing cams carried by said carrier member, a spider secured to said shaft carrying three radially spaced rollers riding respectively on said cams and supporting said shaft, first power means operable to rotate said carrier member in one direction and return to raise and lower the parts feeder member, second power means operable to rotate said shaft in one direction and return to feed the parts along the helical supporting members, control means actuated by said rotatable carrier member and controlling rotation of said rotatable parts feeder member in opposite directions by said second power means, and control means actuated by said rotatable parts feeder member and controlling rotation of said carrier member in opposite directions by said second power means.

References Cited in the file of this patent

UNITED STATES PATENTS 807,565  Lorillard -------------- Dec. 19, 1905